Patented Mar. 6, 1928.

1,661,828

UNITED STATES PATENT OFFICE.

ERNEST HOPKINSON, OF NEW YORK, N. Y.

PAVING MATERIAL AND METHOD OF LAYING THE SAME.

No Drawing.   Application filed December 23, 1922.   Serial No. 608,745.

This invention aims to provide a vulcanized rubber composition that is suitable for paving roads, pavements, floorings and similar purposes, that is durable, noise-absorbing and relatively inexpensive, and that affords a rough or abrasive surface of a non-slippery character suited for traffic, pedestrian or vehicular. It further aims to provide a practical method of making and applying the material securely to a load carrying foundation.

With specific embodiments in mind and without intention to limit more than is required by the prior art, the invention may be briefly described as consisting in assembling various ingredients (constituting a suitable vulcanizable rubber composition) in place, or in situ, on a load carrying foundation or assembling them shortly before, applying them thereto, and then completely, or finally, vulcanizing the composition on the foundation. The load carrying foundation may be made of concrete, asphalt, brick, or any other suitable material capable of sustaining the traffic, and may be built in any well known manner. Among the ingredients of the rubber composition are participators in vulcanization, or promoters thereof, which have a capacity for lowering the temperature of vulcanization, or for shortening the duration of heat treatment, or both capacities, when present together in associated or intermingled relation, not when separated or separately distributed in distinct batches. Two batches of this character, for instance, are separately formed, or prepared, and then intermingled, or otherwise manipulated, for intimate association, either a little while before, or at, the time of their application to the foundation where final, or complete, vulcanization in place is effected, with or without heat treatment to initiate or carry on vulcanization.

The invention may be variously practiced. Two batches, A and B, may be separately prepared of the following ingredients, proportioned by weight as indicated:—

| Ingredient | A | B |
|---|---|---|
| Rubber in latex | 100 | 100 |
| Zinc oxide | 50 | 50 |
| Sand (fine) | 800 | 800 |
| Paraffin wax | 10 | 10 |
| Coal tar | 60 | 60 |
| Sulphur | 10 | 10 |
| Infusorial earth | 100 | 100 |
| Refined mineral oil (#8) | 25 | 25 |
| Oxy normal butyl thiocarbonic acid disulphide | 8 | |
| Di-benzyl amine | | 8 |

This is a lean compound, i. e., one rather low in rubber, suitable for paving where much cushioning or yielding is not required. A more yielding covering, or surface layer, may be obtained with the same ingredients, proportioned as indicated in the following formula:—

| Ingredient | A | B |
|---|---|---|
| Rubber in latex | 300 | 300 |
| Zinc oxide | 60 | 60 |
| Sand (fine) | 800 | 800 |
| Paraffin wax | 15 | 15 |
| Coal tar | 180 | 180 |
| Sulphur | 30 | 30 |
| Infusorial earth | 100 | 100 |
| Refined mineral oil (#8) | 75 | 75 |
| Oxy normal butyl thiocarbonic acid disulphide | 12 | |
| Di-benzyl amine | | 12 |

Whatever may be the composition of the two batches, A and B, they are separately prepared, one containing one or more of the vulcanizing ingredients, and the other one or more of the complementary vulcanizing ingredients, which, separated, are vulcanizingly inert, or substantially ineffective, under the temperatures obtaining during their manipulation prior to association of the batches and to their, at least, final vulcanization in situ on the foundation. In the examples, oxy normal butyl thiocarbonic acid disulphide is distributed in one batch and di-benzyl amine incorporated in the other batch.

Separate preparation of the two batches may be accomplished variously. They may each be agitated, or mixed, in a tank and discharged through a nozzle into a jet of air blown past the same. Discharge of the batches from the mixing tanks may be facilitated by adding water, or by employing an extending device, such as a worm. The sprayed particles of the batches are preferably projected by the air jet into an atmosphere of air, or inert gas, at a temperature and humidity suited to the moisture contained in the particular batch and to the character of the ingredients, particularly the vulcanizing promoters, or accelerators, which latter, of course, may be of various character and power, the invention not being limited to those specifically mentioned in the formulæ. The sprayed particles collect on the floor of the chamber in a substantially dry condition and in more or less friable mass. Thus, dry batches may be prepared, ready for laying, or otherwise manipulating, before vulcanization.

Dry batches may also be prepared by stirring the ingredients in mixing machines, or by turning the material over in any suitable manner to homogenize the mix, and then removing water from the mass, as convenient. This may be accomplished by spreading the mixed ingredients on trays and drying them by gentle heating, with or without vacuous treatment, or, continuously, by passing air over a mixed batch, which is tumbled, or otherwise agitated, in a long cylinder inclined sufficiently to the horizontal to feed the material along.

Alternatively, batches of the rubber composition, each containing one of the complementary vulcanizing inducers, or accelerators, may be separately prepared in a web, or moist, condition, ready, without preliminary drying treatment, for intermingling in situ on a load carrying foundation.

In connection with the mixing of the particular ingredients given in the above formulæ, it is to be borne in mind that infusorial earth absorbs water and tends to dry the batch. Therefore, the proportion of it used is to be varied according to the character of the batch to be prepared for laying on the pavement. Less infusorial earth should be used with batches that are to be laid, or intermingled, while wet than with those to be laid and intermingled in a dry condition. Of course, also, in preparing dry batches, the quantity of infusorial earth must not be so great as to prematurely dry the latex, or rubber solution, and cause coagulation of the rubber before the ingredients have been blended uniformly, or to a satisfactory extent. It is also preferable to add the oil (which acts as a softener) after water has been removed from the batch. It may be used in various proportions to suit the conditions.

The invention is particularly intended for surfacing roads, pavements, or floors, having a concrete, or, like foundation strong enough to carry the load, and preferably of a porous structure capable of being gripped by the composition when it is vulcanized thereon. After preparation, the two batches, A and B, are brought together, intermingled or associated in any manner, permitting vulcanization, of the composite mix in situ on the foundation. This may be done variously. It may be accomplished by rapidly intermingling and thoroughly mixing the A and B batches upon the foundation of the road, pavement, or floor, followed, preferably, by compaction with a roller, for instance a weighty steam roller, which may, or may not, be heated. If the batches are wet, they should, of course, be allowed to dry out after spreading in place. Or, immediately before laying the two, A and B, dry batches, they may be intermingled and calendered into sheets of the thickness of the surface to be applied, or any fractions thereof, the sheet, or sheets, being then—before vulcanization becomes advanced—positioned on the foundation and rolled down, with or without moderate heat, as required by the nature of the vulcanizing ingredients. Still further, the batches may be separately formed into sheets of any desired width—preferably 6 feet—and thickness—for example, about $\frac{1}{18}$th of an inch—, and a suitable number of these, respectively of the A and B composition, alternately superimposed and applied to the foundation, followed by rolling, with or without heat as required. Preferably, the associating or plying up is done on the foundation, each sheet being compacted and heated as it is laid, by rolling, preferably, with a heavy steam-roller. But, variably, layers may be rapidly superimposed at one side of the foundation and then, when assembled and before vulcanized, laid upon the foundation, there being consolidated and completely vulcanized in situ by tamping or rolling, and heating, the latter if required.

Another way in which the invention may be practiced is by making a single composition, or batch, and treating it with a complementary vulcanizing ingredient to effect vulcanization in situ. For instance, to an A compound of the first-mentioned or lean formula, containing, however, four parts of oxy normal butyl thiocarbonic acid dissulphide instead of the figure given therein, an amine may be added in sufficient quantity to effect vulcanization; such an amine, for instance, as aniline, two or three parts thereof in the instant case. Or, to a B compound of the first-mentioned or lean formula, containing, however, four parts of admixed dibenzyl amine, a suitable quantity of carbon disulphide may be applied. In these cases, the final associating of the vulcanizing ingredients, participators or accelerators, with or without an initiating or continuing heat treatment, may take place at any convenient stage, provided only that the material is spread on the foundation before vulcanization proceeds further than compatible with attainment of the end of the invention, to wit, whole or partial vulcanization of the composition in place on the foundation.

In the foregoing, and with specific ingredients for making a satisfactory composition as examples, the invention has been delineated in a manner to illustrate its breadth. Various changes may be made in the procedure without departing from the broad underlying principles of the invention. It is to be understood, therefore, that there is no intention of being limited to the precise ingredients mentioned, a multitude of substances being known to the rubber industry that are equivalent to and usable in place of any, or in some cases a plurality, of those given in the examples. The specific compounds mentioned are satisfactory, however, and sufficient to guide others in fully practicing the invention with the same, or equivalent, ingredients.

When the materials have been laid and vulcanized in place, or "in situ", the load carrying foundation is covered by a more or less yielding stratum of vulcanized rubber composition, preferably half an inch or more in thickness, the thickness being variable. As applied to the concrete foundation, such as a road or pavement, it not only renders the concrete less susceptible to variations in length by moisture from overhead, but also less susceptible to variations in length from moisture that creeps by capillarity through the sub-base up through the concrete foundation of a road, for instance. This last because it forms a substantially impervious covering that stops off the pores in the concrete and confines air therein so as to oppose trapped air to capillary action. Made of substantial proportions of rubber and sand, than which there are no more suitable and durable materials for paving, it affords a covering, or top dressing, which not only wears well, but affords a good grip for traffic, either the feet of pedestrians or the wheels of vehicles. Being consolidated in place on the foundation, preferably by rolling, it adapts itself to all irregularities in the surface of the foundation and tenaciously roots itself in pores, or fissures, in the upper face thereof. As it is somewhat insulating in character, it tends to minimize temperature changes in the foundation, tending to change the length thereof, and thereby adds to its advantages as a covering for roads, pavements and floors. It may be laid indoors, in combination with any other materials that have been previously located on the foundation to define a border or pattern. Within the broad invention, it may be applied to wooden floorings where the traction of pedestrians does not amount to much. Obviously, it adapts itself to hall or room floorings of any shape and possesses marked advantages over rubber blocks or interlocking tiles that have heretofore been individually formed and laid upon floors.

It is desirable to bevel or chamfer the margins of the surfacing material and to provide expansion joints therein coincident with those in the foundation. If the foundation is continuous, i. e., unbroken by expansion joints, the surfacing or paving composition may likewise be continuous, but advantageously it is parted to provide expansion joints therein at suitable intervals, for instance, on floorings or pavements every six feet, or on roads every twenty-five or more feet. The gaps, or joints, may be filled with tar, asphalt, sand, self-collecting detritus, or other filling materials. Desirably, all joints, or gaps, are lined at the bottom thereof with a little of the composition to exclude water from working beneath the foundation.

It is to be understood that the rubber composition may be of any suitable character permitting "place" vulcanization thereof. Obviously, however, vulcanizing ingredients, susceptible of manipulation without premature vulcanization, and having capacities for either or both lowering the curing temperature, or shortening the duration of heat, with or without heat treatment, are more desirable than mere sulphur compounds requiring elevated temperatures around 275° F., to insure vulcanization. The desideratum is a composition capable of vulcanization with a heated roller which, regardless of its temperature, sufficiently elevates the temperature of the applied surface, or paving stratum, to initiate, or to continue, vulcanization thereof, and thereby satisfactorily bonds or secures the material to the foundation of the road or floor.

It is preferable to derive the rubber from latex by drying it after admixture with the various ingredients in preparing the batches. The fluidity of the latex lends itself readily to mixture. Gum solutions, however, may be used, but, requiring a solvent, they are believed far less desirable than latex.

In view of the many possible variations both in the procedure and in the compositions, reference is made to the accompanying claim for an understanding of the scope of the invention.

Having thus described my invention, what I claim and desire to protect by Letters Patent is:—

That method of surfacing a rigid and immovable load carrying foundation which consists in, separately mingling with a plurality of aqueous rubber compositions vulcanizing agents ineffective alone but effective to vulcanize in the presence of each other, removing water and associating the two compositions in intimate relation on the foundation, and vulcanizing the composition in situ on the foundation.

Signed at New York city, county of New York, and State of New York, this 22nd day of December, 1922.

ERNEST HOPKINSON.

CERTIFICATE OF CORRECTION.

Patent No. 1,661,828.            Granted March 6, 1928, to

ERNEST HOPKINSON.

It is hereby certified that error appears in the printed specification of the above numbered patent requiring correction as follows: Page 1, line 97, for the word "extending" read "extruding"; and that the said Letters Patent should be read with this correction therein that the same may conform to the record of the case in the Patent Office.

Signed and sealed this 3rd day of April, A. D. 1928.

Seal.                                    M. J. Moore,
                                          Acting Commissioner of Patents.